United States Patent [19]

Finn et al.

[11] 4,291,898
[45] Sep. 29, 1981

[54] RESTRAINT BELT POSITIONER

[75] Inventors: Bernard J. Finn, Troy; Brian T. Haddlesey, Sterling Heights, both of Mich.

[73] Assignee: General Motors Corporation, Detroit, Mich.

[21] Appl. No.: 131,063

[22] Filed: Mar. 17, 1980

[51] Int. Cl.³ ............................................. B60R 21/10
[52] U.S. Cl. ................................... 280/804; 280/807; 280/808
[58] Field of Search .............. 280/801, 802, 804, 807, 280/808; 297/473, 481, 483, 485, 486

[56] References Cited

U.S. PATENT DOCUMENTS

| | | | |
|---|---|---|---|
| 3,807,523 | 4/1974 | Fiala | 280/804 |
| 3,810,657 | 5/1974 | Campell | 280/808 |
| 3,829,123 | 8/1974 | Holka | 280/808 |
| 3,882,955 | 5/1975 | Kaneko | 280/804 |
| 3,907,329 | 9/1975 | Erion | 280/808 |
| 4,060,260 | 11/1977 | Collins | 280/808 |
| 4,193,613 | 3/1980 | Cachia | 280/804 |
| 4,232,882 | 11/1980 | Stephenson | 280/804 |

Primary Examiner—Joseph F. Peters, Jr.
Assistant Examiner—Randall A. Schrecengost
Attorney, Agent, or Firm—Charles E. Leahy

[57] ABSTRACT

A belt for restraint of a seat occupant has an upper end mounted on the vehicle body generally above and rearward a door opening and a lower end mounted on the body generally adjacent the occupant hip. A retractor mounts one of the belt ends and winds the belt to a stowed position extending partially across the door opening and partially obstructing access to a vehicle compartment located behind the occupant seat. A track extends along the roof rail forwardly from the upper end of the belt. A carriage is slidably movable along the track and has a belt loop slidably encircling the belt. A hand grip is provided on the carriage by which the carriage may be manually gripped for forward sliding movement along the track to unwind the belt from the retractor and stow a belt portion along the roof rail and thereby substantially lessen the belt obstruction of access to the compartment behind the seat. A latch is provided to latch the carriage at the forward position and is releasable to permit rearward movement of the carriage by the retractor to reestablish the shoulder belt in the normal stowed position in readiness for donning by the occupant.

4 Claims, 5 Drawing Figures

RESTRAINT BELT POSITIONER

This invention relates to a shoulder belt for restraining a seated occupant and, more particularly, provides a belt carriage which is longitudinally displaced along a roof rail track to stow the shoulder belt along the roof rail to thereby facilitate entry to a rear seat compartment.

BACKGROUND OF THE INVENTION

It is well known to provide a restraint belt system in which a restraint belt has an upper outboard belt end mounted on the vehicle body roof or door pillar and a lower outboard end mounted on the vehicle floor structure generally adjacent the outboard occupant hip. A latch plate is slidable along the belt to divide the belt into a lap belt portion and a shoulder belt portion. The latch plate is selectively engaged with a buckle mounted inboard the seat to dispose the lap belt portion in restraining position across the occupant lap and the shoulder belt portion diagonally across the upper torso. A retractor is associated with one of the belt ends to wind the belt to a stowed condition when the occupant alights from the vehicle.

The aforedescribed seat belt system is conventionally used in conjunction with the front seat of a two-door vehicle. The back of the front seat is forwardly tilted to facilitate entry of a rear seat occupant to and from the rear seat compartment. It has been recognized that the belt extends across the access opening to the rear seat. Accordingly, prior art patents such as U.S. Pat. No. 3,810,657, issued May 14, 1974 to David D. Campbell, have proposed that the shoulder belt be routed through a guide loop on the seatback and that the guide loop be mounted on a telescopically extensible member which pivots forward with the seat-back and is cammed vertically upwardly to raise the shoulder belt to a position which enlarges the access passageway to the rear seat.

The present invention improves access to the rear seat by the provision of a belt carriage which is slidably movable on a longitudinally extending track mounted on the roof rail to permit forward and upward movement of the shoulder belt to a stowed position along the roof rail.

According to the present invention, the restraint belt has an upper end mounted on the vehicle body generally above and rearward the door opening and another end mounted generally adjacent the occupant hip. A retractor provided at one of the belt ends winds the shoulder belt to a stored position extending partially across the door opening and partially obstructing access to the rear seat passenger compartment through the door located laterally adjacent the vehicle seat with which the restraint belt is associated. A track extends along the roof rail forwardly from the upper end of the restraint belt. A carriage is slidably movable along the track and has a belt loop slidably encircling the restraint belt. A hand grip is provided on the carriage by which the carriage may be manually gripped for forward sliding movement along the track to unwind the restraint belt from the retractor and stow a belt portion along the roof rail to substantially lessen the belt obstruction of access to the rear seat passenger compartment. A selectively releasable latch is provided to latch the carriage at the forward position and is released to permit rearward movement of the carriage by the retractor to reestablish the restraint belt in the normal stored position in readiness for donning by the front seat occupant.

Accordingly, the object, feature and advantage of the invention is seen to reside in the provision of a track-and-carriage assembly on the roof rail adapted to dispose the shoulder belt in parallel stowed relation with the roof rail to lessen the degree of belt obstruction of access to the rear seat compartment.

A still further object, feature and advantage of the invention resides in the provision of a belt carriage forwardly movable along a roof rail track for storing a shoulder belt along a roof rail to facilitate access to a rear seat and a carriage-latch adapted to retain the carriage forwardly and selectively releasable to permit rearward carriage movement by the retractor to reestablish the shoulder belt in the normal position in readiness for donning by the front seat occupant.

These and other objects, features and advantages of the invention will be apparent upon consideration of the following specification and the appended drawings, in which.

Figure 1:
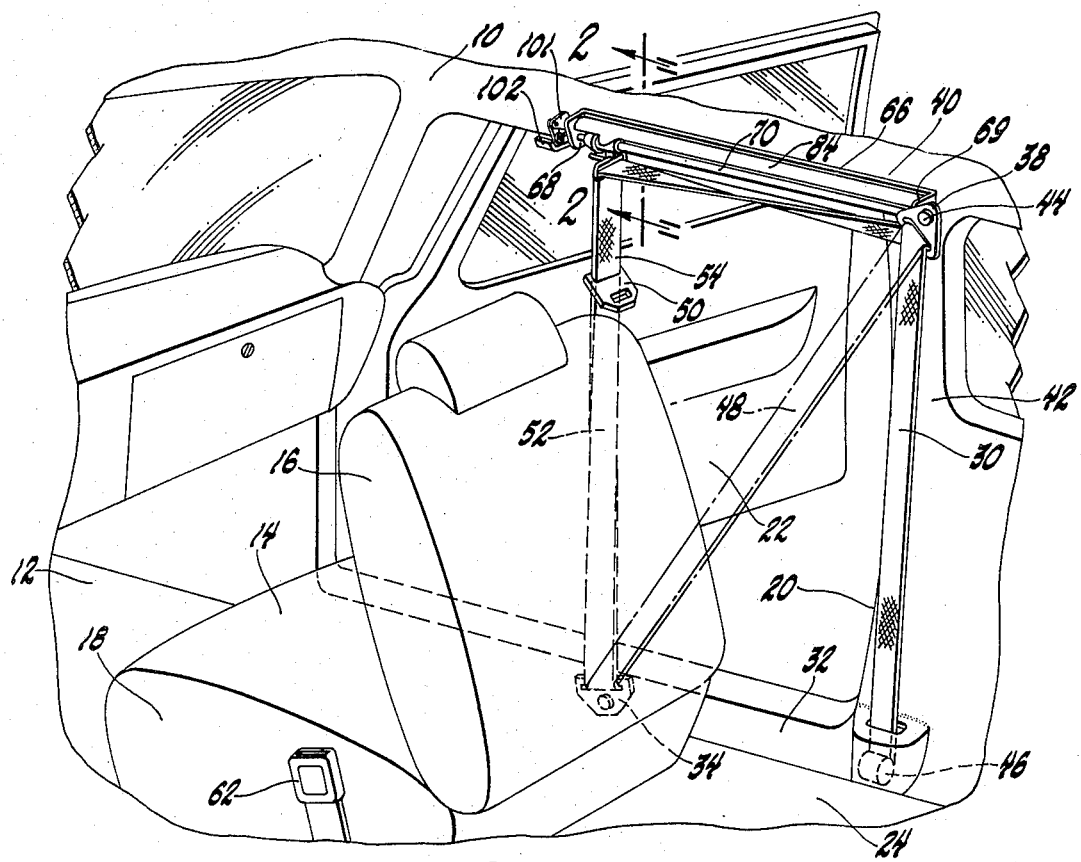
FIG. 1 is a perspective view of a restraint belt system embodying the invention and shown with the door open and the belt carriage latched in a forward position stowing the shoulder belt along the roof rail to facilitate access to the rear passenger compartment.

Referring to FIG. 1, there is shown a vehicle body 10 defining a front seat compartment 12 in which a vehicle seat 14 is mounted. The vehicle seat 14 includes a seat back 16 which is forwardly tiltable relative a seat bottom 18. The seat 14 is located laterally adjacent a door opening 20 which is selectively opened and closed by a door 22. The vehicle body 10 also has a rear seat compartment 24 which is accessible through the door opening 20 upon forward tilting movement of the seat back 16, as shown in FIG. 1.

A restraint belt system for restraint of a front seat occupant upon the vehicle seat 14 includes a continuous-loop belt 30. The lower end of the belt 30 is attached to the sill structure 32 of the vehicle body floor by a mounting bracket 34. The upper end of the belt 30 is mounted generally adjacent the occupant shoulder by a slide loop 38 mounted by a bolt 44 at the juncture of the vehicle body roof rail 40 and the door pillar 42. The belt 30 is slidable through the slide loop 38 and is attached to a seat belt retractor 46. The retractor 46 winds the belt 30 to phantom-line indicated position 48 in which the belt is seen to extend across the door opening in a manner which obstructs access to the rear seat.

A latch plate 50 is slidable along the belt 30 and divides the belt 30 into a lap belt portion 52 and a shoulder belt portion 54. The latch plate 50 is selectively engageable within a buckle 62 mounted inboard the seat to respectively dispose the lap belt portion 52 and shoulder belt portion 54 in restraining positions across the lap and upper torso of the seated occupant.

Figure 2:
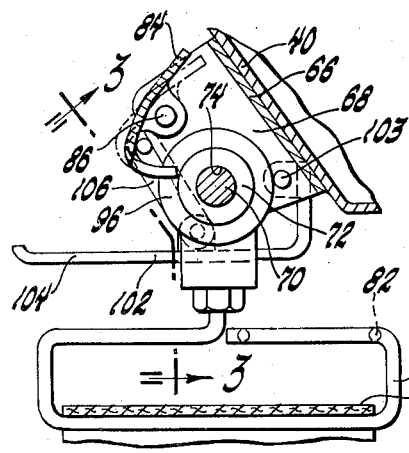
FIG. 2 is a sectional view taken in the direction of the arrows 2—2 of FIG. 1.
Figure 4:
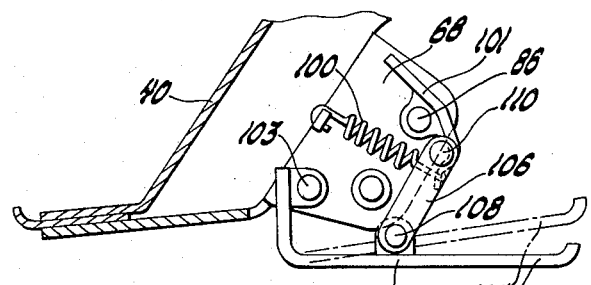
FIG. 4 is a sectional view taken in the direction of the arrows 4—4 of FIG. 3 and showing a manually actuable latch release handle.
Figure 3:
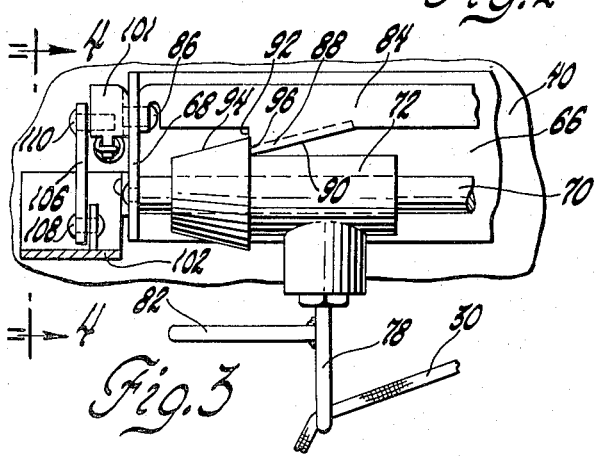
FIG. 3 is a sectional view taken in the direction of the arrows 3—3 of FIG. 2.

As shown in FIG. 1, a track-and-carriage arrangement is provided by which the shoulder belt portion 54 may be stowed along the roof rail 40 to lessen its obstruction of access to the rear seat. As best seen in FIGS. 2 through 4, the carriage-and-track assembly includes a mounting bracket 66 which is suitably welded, screwed, or otherwise attached to the roof rail 40. The bracket 66 has a laterally extending mounting leg 68 at the forward end thereof and a like mounting leg 69 at the rearward end thereof. A cylindrical track 70 extends between the mounting legs 68 and 69. A carriage 72 has a longitudinally extending central bore 74 which receives the track 70 to mount the carriage 72 for longitudinal fore and aft sliding movement along the track 70.

As best seen in FIGS. 2 and 3, an annular belt loop 78 is attached to the belt carriage 72 and encircles the belt 30. A finger grip 82 is attached to the carriage 72 so that the carriage may be manually moved forwardly along the track 70 to the position shown in FIG. 1.

As best seen in FIGS. 2 and 3, a latch is provided to retain the carriage 72 in the forward position shown in FIG. 1. The latch includes a latch bar 84 which extends between the mounting legs 68 and 69 and has its ends pivoted thereto by rivets 86. The latch bar 84 has a latch tab 88 having a lead-in cam surface 90 and a latch face 92. The carriage 72 has a mating cam surface 94 and a latch face 96. During forward movement of the carriage 72, the cam surfaces 90 and 94 interact to bias the latch bar 84 from the solid line indicated position of FIG. 2 to the phantom line indicated position of FIG. 2. When the carriage 72 reaches the full forward position, a coil tension spring 100 acting between the mounting bracket 66 and an offset arm 101 attached to the latch bar 84 via rivet 86 returns the latch bar 84 to the solid line indicated position of FIG. 2 in which the carriage latch face 96 is engaged with the latch bar latch face 92 to retain the carriage 72 at the forward position.

Referring again to FIG. 1, it is seen that latching of the carriage 72 at the forward position stows an intermediate length of the shoulder belt portion 54 along the roof rail 40 to substantially lessen the extent of shoulder belt obstruction to rear seat entry and exit.

Referring to FIG. 4, a release handle mechanism is shown for moving the latch bar 84 out of engagement with the carriage 72. The release handle mechanism includes an actuating lever 102 pivoted to the mounting bracket 66 by pivot 103 and having a hand grip 104 for actuation by the vehicle occupant. A connecting link 106 is connected to the actuating lever 102 by a pivot pin 108 and is connected to the offset arm 109 by a pivot pin 110. Upward pivotal movement of the hand grip 104 from the solid line indicated position of FIG. 4 to the phantom line indicated position of FIG. 4 causes the connecting link 106 to pivot the offset arm 101 and the latch bar 84 in the counterclockwise direction, as viewed in FIG. 4, to disengage the latch bar latch face 92 from engagement with the carriage latch face 96. Accordingly, the belt retracting effort of the retractor 46 is permitted to wind the continuous-loop belt 30 and concommittently move the carriage 72 rearwardly to the normal position adjacent the slide loop 38.

Figure 5:
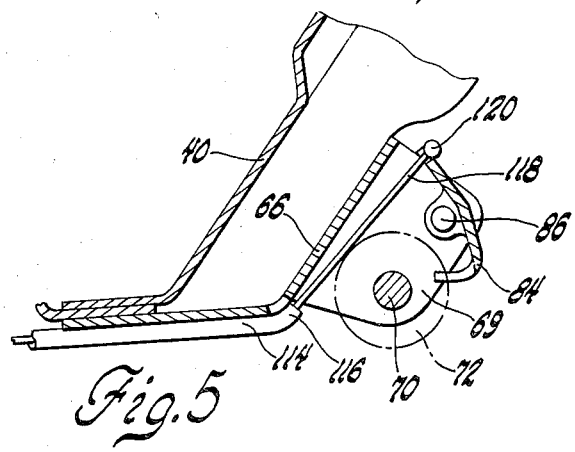
FIG. 5 is a view similar to FIG. 4 but showing a remotely actuable latch release handle.

Referring to FIG. 5, there is shown an alternate release mechanism for the latch bar 84. According to this embodiment of the invention, a push-pull cable assembly 114 includes a sheath 116 and control wire 118. The control wire 118 has an enlarged end 120 which seats against an aperture formed in the latch bar 84. The other end of the control wire 118 (not shown) may be associated with a door operator plunger transmission selector lever so that the latch will be automatically released. The control wire 118 may also be connected to a manually operable handle located on the instrument panel.

While the invention has been disclosed primarily in terms of the specific embodiments shown in the drawings, it is not intended to be limited thereto, but rather only to the extent set forth in the appended claims. For example, the shoulder belt system disclosed herein is a continuous-loop belt having a latch plate slidable therealong. It will be understood that the teachings of this invention are also applicable to other shoulder belt systems which may partially obstruct entry to the rear seat compartment.

The embodiments of the invention in which an exclusive property or privilege is claimed are defined as follows:

1. In combination with a vehicle body having a door opening defined in part by a roof rail, a seat located laterally adjacent the door opening and having a seat back forwardly pivotal to permit access to the vehicle body compartment rearwardly of the seat back, a restraint belt system comprising:

a restraint belt having one end mounted on the vehicle body generally above and rearward the door opening and another end mounted generally adjacent the occupant hip;

a retracting mechanism provided at one of the belt ends normally maintaining the shoulder belt in a stored position extending across the door opening and partially obstructing access to the compartment behind the seat back and permitting winding and unwinding movement of the shoulder belt to and from an occupant restraining position;

a track extending along the roof rail generally forwardly from the one end of the restraint belt;

a carriage slidably movable along the track and having a belt loop slidably encircling the restraint belt and hand grip means by which the carriage may be manually gripped for foward sliding movement along the track to unwind the restraint belt from the retracting mechanism and dispose the restraint belt along the roof rail and more generally forward of the door opening to facilitate access to the compartment rearwardly of the seat back;

latch means adapted to latch the carriage at the forward position against rearward movement by the belt winding effort of the retracting mechanism; and means for selectively releasing the latch means to permit rearward movement of the carriage by the winding effort of retracting mechanism to reestablish the restraint belt in the stored position.

2. In combination with a vehicle body having a door opening defined in part by a roof rail, a seat located laterally adjacent the door opening and having a seat back forwardly pivotal to permit access to the vehicle body compartment rearwardly of the seat back, a restraint belt system comprising:

a restraint belt having an upper end mounted on the vehicle body generally above and rearward the door and a lower end mounted on the vehicle body below the door opening and generally adjacent the occupant hip;

a retractor provided at one of the belt ends adapted to wind the belt to a stored position extending rectilinearly between the upper and lower mounted ends thereof in partial obstruction of the occupant access through the door to the compartment behind the seat back;

a latch plate carried by the restraint belt;

a buckle mounted on the vehicle body inboard the seat adapted for selective engagement by the latch plate upon unwinding of the restraint belt from the retractor so that the restraint belt is divided into a lap belt extending transversely across the occupant lower torso and a shoulder belt extending diagonally across the upper torso;

a track extending along the roof rail generally forwardly from the upper end of the restraint belt;

a carriage slidably movable along the track and having a belt loop slidably encircling the restraint belt and hand grip means by which the carriage may be manually gripped for forward sliding movement along the track to unwind the restraint belt from the retractor and dispose the shoulder belt portion of the restraint belt along the roof rail and extend the lap belt portion in a generally vertical attitude more generally forward relative the door opening to facilitate occupant access to the compartment rearwardly of the seat back;

latch means adapted to latch the carriage at the forward position against rearward movement by the belt winding effort of the retractor; and means for selectively releasing the latch means to permit rearward movement of the carriage by the winding effort of the retractor to reestablish the restraint belt in the normal stored position.

3. The combination of claims 1 or 2 further characterized by the latch means being selectively releasable by occupant actuation of a manual release handle adapted to unlatch the latch means.

4. The combination of claims 1 or 2 further characterized by a push-pull cable connecting the latch means with a selected occupant movable structure of the vehicle body whereby the latch means is automatically released to permit rearward movement of the carriage by the winding effort of the retracting mechanism concommittently with occupant operation of the occupant movable structure.

* * * * *